United States Patent [19]

Hermann et al.

[11] Patent Number: 5,256,703

[45] Date of Patent: Oct. 26, 1993

US005256703A

[54] ABRASIVE PROPELLANT FOR CLEANING OF SURFACES AND MACHINERY

[75] Inventors: Paul F. Hermann, Boothbay, Me.; William R. Lynn, Dover, N.H.

[73] Assignee: Sponge Jet Inc., Dover, N.H.

[21] Appl. No.: 757,977

[22] Filed: Sep. 12, 1991

Related U.S. Application Data

[63] Continuation-in-part of Ser. No. 376,764, Jul. 7, 1989, abandoned, and a continuation-in-part of Ser. No. 606,169, Oct. 31, 1990, abandoned.

[51] Int. Cl.$^5$ ................................ C08L 75/04
[52] U.S. Cl. ............................. 521/120; 521/122; 521/123; 521/159; 524/779; 524/785; 524/786; 524/789; 528/59
[58] Field of Search .............. 521/120, 122, 123, 159; 524/779, 785, 786, 789, 791; 528/59

[56] References Cited

U.S. PATENT DOCUMENTS

| | | | |
|---|---|---|---|
| 2,609,347 | 10/1957 | Johnson et al. | 521/120 |
| 2,664,366 | 3/1958 | Bevin et al. | 521/122 |
| 2,731,377 | 1/1956 | Riddell et al. | 524/621 |
| 3,912,667 | 4/1967 | Jintzu et al. | 521/159 |
| 3,918,220 | 9/1967 | Smith et al. | 528/65 |
| 4,034,769 | 7/1968 | Davison et al. | 524/728 |
| 4,038,380 | 8/1968 | Waters et al. | 524/826 |
| 4,100,242 | 7/1978 | Leach | 524/768 |
| 4,158,576 | 6/1979 | Butz | 521/120 |
| 4,229,223 | 10/1980 | Flake | 524/809 |
| 4,343,910 | 8/1980 | James et al. | 524/728 |
| 4,439,073 | 3/1984 | White | 406/125 |
| 4,473,671 | 9/1981 | Whitby et al. | 521/122 |
| 4,537,914 | 4/1984 | Nakamara et al. | 521/159 |
| 4,551,481 | 11/1985 | Smith et al. | 524/826 |
| 4,594,362 | 6/1986 | Smith et al. | 524/724 |
| 4,626,428 | 8/1987 | Dorm et al. | 524/866 |
| 4,731,125 | 3/1988 | Carr | 524/809 |
| 4,816,509 | 9/1988 | Ester et al. | 521/159 |
| 4,871,789 | 10/1988 | Jones et al. | 528/60 |
| 4,943,603 | 9/1989 | James et al. | 521/159 |

FOREIGN PATENT DOCUMENTS

| | | |
|---|---|---|
| 0218869 | 4/1987 | European Pat. Off. . |
| 0324937 | 7/1989 | European Pat. Off. . |
| 2048524 | 4/1972 | Fed. Rep. of Germany . |
| 225021 | 11/1973 | Fed. Rep. of Germany . |
| 2220225 | 11/1973 | Fed. Rep. of Germany . |
| 3131002 | 3/1983 | Fed. Rep. of Germany . |
| 509624 | 1/1975 | Japan . |
| 8801397 | 6/1989 | Netherlands . |
| 654510 | 2/1986 | Switzerland . |
| 2128911 | 5/1984 | United Kingdom . |
| 2226033 | 6/1990 | United Kingdom . |

OTHER PUBLICATIONS

Hawley (ed), *The Condensed Chemical Dictionary*, Van Nostrand, N.Y., 1977.

Patent Abstracts of Japan, vol. 8, No. 47 (M-280) (1484) Mar. 2, 1984.

*Primary Examiner*—Maurice J. Welsh
*Attorney, Agent, or Firm*—Felfe & Lynch

[57] ABSTRACT

Particles of abrasives such as Garnet, Staurolite or Wollastonite bound to polymer are used as propellant particles to remove undesired materials from surfaces such as floors, walls, ceilings, machinery etc. For example, soil, paint, oil, grease etc. can be thereby removed.

48 Claims, 5 Drawing Sheets

PRIOR ART

ABRASIVE PROPELLANT FOR CLEANING OF SURFACES AND MACHINERY

This application is a continuation-in-part of pending U.S. patent application Ser. No. 07/376,764 filed Jul. 7, 1989 and a continuation-in-part of pending U.S. application Ser. No. 606,169 filed Oct. 31, 1990 both abandoned.

This invention relates to polymeric products of minerals such as calcium metasilicate especially Wollastonite and other abrasives.

A preferred embodiment of the invention relates to a granulated medium or variety of compositions having a negligible or very low dust content for use in blasting equipment which propels the media, via a pressurized air stream, against a surface of an object to dislodge and absorb the contaminant thereon without harm to the surface. The contaminant to be removed may include any foreign substance attached to or adhering to a surface such as hazardous materials, soil, grease, oil, solvents, and other objectional deposits. The invention concerns improved removal of surface coatings such as paint, resinous materials, baked-on grease and other objectionable materials from hard or soft substrates which may be harmed by conventional sandblast-type cleaning. Examples are oily residue on wallpaper, PVC resin on molds, or lead paint coatings. Thus another object of the invention is to not harm the substrate.

BACKGROUND OF THE INVENTION

Calcium metasilicate is known and used as Wollastonite as a filler for dental abrasives, (U.S. Pat. No. 4,038,380) bone implants, automotive parts (WO 9103513, U.S. Pat. Nos. 4,943,603 and 4,871,789), paints (JP 1141964), molded plastics U.S. Pat. No. 3,007,757 bone implants (DDR 268130, 268113, 268114), orthopedic casts (U.S. Pat. No. 4,473,671), acrylic coating for finger nails (U.S. Pat No. 4,626,428) and sealants (U.S. Pat. No. 4,816,509).

The object of the media for cleaning is to dislodge or remove the surface contaminant so as to minimize as much as possible dust formation, to absorb the same possibly within the interstices of the media, and then to release the contaminant from the media into a washing fluid during a cleaning operation. Cleaning of the media allows the media to be re-used and facilitates concentration of the contaminants for efficient disposal in a reduced volume.

Suitable blasting equipment for propulsion of media according to the present invention is described in U.S. patent application Ser. No. 07/376,764, now abandoned filed Jul. 7, 1989 hereby incorporated by reference. The operation of such blasting equipment is facilitated by a product having the characteristics of the preferred embodiment of the invention which greatly enhances its operation. The prescribed characteristics of the media include, but are not limited to, angle of repose, density, tensile strength, particle size, lipophilicity and cost. Clarification of the above terminology with respect to the present invention will become apparent to those skilled in the art with reference to the following detailed description and accompanying drawings.

Materials are also known which are used for cleaning as particulate cleaning agents.

U.S. Pat. No. 4,594,362 to Smith and Murphy concerns a textile cleaning stick yielding shreds which serve to remove soil. Silanes are used to bind the abrasive particles to the foam matrix.

A granulated form of media is described, for instance, in U.S. Pat. No. 4,551,481 to Smith et al in which such media is generally used for the cleaning of rugs or floors. That U.S. Patent is believed to be the most relevant prior art to the preferred embodiment of the present invention. Other particle abrasive system to be used in machinery which propels abrasive against a substantially hard surface to remove or polish the surface are known. See U.S. Pat. Nos. 4,034,769, 3,918,220, 3,912,667, 2,609,347, 2,664,366, 4,537,914 and 4,343,910.

Calcium sulfate is known and used as gypsum in building materials such as wall board. Gypsum has the formula $CaSO_4 \times H_2O$ and is used in its hydrated or calcined (non-hydrated) form as a filler for paints and candies, fertilizer, as an additive to soften Portland cements, as a plastic and for making plasterboard and wallboard. Other materials are known to be added to the gypsum as an admixture to form building materials.

This U.S. Pat. No. 4,100,242 to Leach shows addition of polystyrene beads to gypsum. Dixon et al in U.S. Pat. No. 2,862,829 adds animal or vegetable material to gypsum to form a building material. Preformed foam is added to gypsum to produce a light-weight building material, U.S. Pat. No. 2,731,377 to Riddell et al. uses a resin admixed with gypsum for a building material. Also see U.S. Pat. No. 4,229,223 to flake showing addition of a resin foam to gypsum to form a building material.

JP 73 00 22 mixed polyurethane foam with a styrene monomer to react same. This was then mixed with $CaSO_4.5H_2O$ and water. Thus the polymer is formed first and then mixed with gypsum.

JP 5009624 appears to be primarily a gypsum product as opposed to the invention teaching a reaction product of a water-foamable product, polystyrene and $CaSO_4$.

A product according to U.S. Pat. No. 4,551,481 was evaluated and found to have too low a dry density to be propelled properly by the intended blasting equipment and, in addition, dusted significantly upon impact. Attempts to improve product performance by the use of various fillers failed. The following is a table of the fillers, silane and the prepolymer contents, by weight, tested.

| No. | Filler Tested | % Silane Content | % Prepolymer |
|---|---|---|---|
| 1 | FELDSPAR | .5–5 | 5–20 |
| 2 | GYPSUM | .5–5 | 5–20 |
| 3 | ATTAPULGITE | .5–5 | 5–20 |
| 4 | ALUMINUM OXIDE | .5–5 | 5–20 |

Each of the above materials was evaluated for flow through suitable blasting equipment and for dusting. The above materials were found unacceptable for the equipment and/or because of dusting and breakdown.

U.S. Pat. No. 4,158,576 to Butz shows sponges propelled onto a surface with liquid, or as dry sponge to absorb liquid.

Montmorillomite, a typical clay material used as a rapid drying high temperature calcined material which is inexpensive and harder in water than most clays, reduces dusting but otherwise does not work satisfactorily in the intended use because it does not form a satisfactory re-usable granule.

The invention using garnet and/or Wollastonite (calcium metasilicate) with or without iron aluminum silicate (Staurolite) produced less dust than any of the other materials. After use of the above gypsum materials, dust from the mineral was produced over equipment and users. Use of the Wollastonite material of the invention produced negligible or little dust from release of mineral fragments in comparison. No dust was produced in a stationary air area greater than about 20 feet from the target. Thus the invention is considerably more user-friendly than any material tested above or in the prior art. In comparison asbestos material can produce minute dust particles which remain in the air for hours. The invention granules have weight so that they settle to the ground and produce little if any dust. Any substantial dust formation must then be produced by the material being blasted by the granules.

Applicants search for a material to aid in binding and to ensure the phibral strength upon impingement without fracture, has led to a series of experiments with Wollastonite. Various degrees of silane treatments have been evaluated vs volume of Wollastonite (aqueous). In one experiment, 100 grams of granulated product was vigorously mixed with 500 grams of water and tested. The above mixture was then filtered through a conical filter and the effluent was tested for solids content. It was found that Silane treated Wollastonite and Staurolite were significantly better than gypsums. However, success in the lab was not replicated during a machine test of the product during which the product broke down, dusted and flowed poorly through the blasting equipment because it plugged the nozzle and bridged the feed system for the product.

However, further work using Wollastonite showed an improved product when latex was eliminated from the formulation.

Carr in U.S. Pat. No. 4,731,125 shows a cleaning material from which contaminants cannot be removed so that the material in Carr is not reusable.

The object of the invention is to provide complexed and/or polymeric compounds containing bound minerals such as but not limited to garnet, Wollastonite, Staurolite and water-foamable polymeric material which avoid the excessive dust problem and breakdown problems of the prior art and can be recycled for further use. Cleaning of the particles of the invention allows this media to be reused and facilitates concentration of the contaminants for efficient disposal in a reduced volume. Ser. No. 376,764 discloses in general employing a pliant medium or light mineral essentially free from dust and discusses use of particulate media and reduction of the contaminated liquid; such as foam pretreated with a dry powder to increase density and abrasiveness. Specific media are herein disclosed.

It is also one of the objects of the present invention to overcome the aforementioned problems of cleaning media to provide a media capable of performing in the aforementioned desirable manner.

It is an object of the invention to provide a variety of compositions to clean hard or soft substrates and dislodge and/or remove objectionable soils. It is another object for the compositions to be capable of being propelled through the air to impact the substrate without harm thereto. Ser. No. 606,169 disclosed gypsum and Wollastonite compositions. Improved compositions of Wollastonite are herein disclosed.

It is another object of the invention to contain through absorption the soil or dust removed onto the composition and allow removal of the soil or dust in order to reuse or recycle the composition.

It is a further object to provide improved methods of polishing or cleaning hard or soft substrates by removal of objectionable soil (such as softened lead paint) and incinerating entire spent material. It is a further object not to leave any or minimal residue on a substrate or in the air.

SUMMARY OF THE INVENTION

A loose particulate abrasive having hydroxy groups on the surface wherein particle size vs hardness is tailored to the specific application.

A hydrophilic, lipophilic polyurethane prepolymer which when mixed with an aqueous phase will react with and coat the abrasive and be compressible and absorbent.

The resultant composition is to be continuously mixed, poured, allowed to use, gelled to tack-free and comminuted to a specific size. The foamed and sized composition is to be used in a relatively dry mode to remove foreign objects or coatings from hard or soft substrates.

BRIEF DESCRIPTION OF THE DRAWINGS

The invention will now be described, by way of example, with reference to the accompanying drawings in which.

DESCRIPTION OF THE PREFERRED EMBODIMENTS

In accordance with the present invention a lipophilic/hydrophilic, flexible, open cell water-foamable polymeric material such as a polyurethane-Wollastonite and/or staurolite interpolymer is obtained by a chemical reaction under foam forming and interpolymer conditions. The term "interpolymer" is used to indicate that the polyurethane is somehow bound to the abrasive mineral such as garnet or Wollastonite by some sort of bonding whether hydrogen bonding, chemical bonding or by complex or by adsorptive or absorptive bonding, rather than being merely an admixture of the components as in the prior art. The bonding can be combinations of the above. The invention is not limited thereto. The interpolymer of the invention can be for example the cured product of a mixture of substantially linear isocyanate capped polyether polyol prepolymer, having an average functionality of less than 2, a cell formation regulating amount of surfactant and water.

Preferably the invention comprises a lipophilic flexible open cell urethane-Wollastonite interpolymer obtained by reacting, under interpolymer and urethane forming conditions, (a) a substantially linear isocyanate capped prepolymer having a reactive functionality of less than 2 mixed with (b) an aqueous solution comprising Wollastonite and surfactant. Preferably the interpolymer has an active functionality of from about 1.3 to about 1.9, and more preferably of from about 1.5 to about 1.8. The linear polyether polyol is derived from a difunctional, active hydrogen-containing initiator and one or more 1,2-epoxides which will impart hydrophilic properties to the resulting polyol, or from ethylene glycol and ethylene oxide or prepared from a substantially linear polyether polyol of the general formula $H(OCH_2CH)_mOCH_2CH_2O(CH_2CH_2O)_nH$ wherein m and n each is an integer of from 2 to about 250 and m and n taken together is an integer of from about 3 to about 500, preferably in which m and n each is an integer of from about 5 to about 80 and m and n taken together is an integer of from about 20 to about 200. The average molecular weight of the polyol is from about 200 to about 20,000, preferably from about 800 to about 10,000.

The prepolymer may be prepared with a toluene disocyanate (TDI); the acrylic is preferably an acrylic latex, the gypsum is US Hydrostone gypsum and the surfactant is a preferably non-ionic surface active agent with from about 0.5 to about 5.0 percent surface active agent by weight of prepolymer added to the interpolymer, preferably from about 1.0 to about 2.0 percent surface active agent by weight of prepolymer. However, the formulations are preferably without latex.

Generally from about 6.5 to about 400 moles of water are reacted with the prepolymer, preferably from about 20 to about 200 moles of water. This differs from other urethanes where stoichiometric amounts of water are used.

The granulated product of this invention exhibits unexpected lipophilic characteristics and is able to release any absorbed contaminants and debris during a wash or cleaning process. Still another surprising characteristic of this mineral-abrasive polymer such as polyurethane/garnet/ Wollastonite/staurolite interpolymer is its ability to be propelled against a surface to be treated to minimize or not create any dust or fine particulate matter upon impact. The product of the invention is useful for a variety of different applications, including the aforementioned.

The resultant composition is to be continuously mixed, poured, allowed to rise, gelled to tack-free and comminuted to a specific size. The foamed and sized composition is to be used in a relatively dry mode to remove foreign objects or coatings from hard or soft substrates.

The mineral abrasive may be present in a varied range of proportions in relation to the prepolymer. Generally the percentage of abrasive to total composition can vary from 1% to over 90%, more preferably in the 70 to 90% range. The abrasive is much lower in cost and higher in specific gravity so that its use at the highest level of addition is important in general cost as well as density. The particulate abrasive is preferably a water insoluble, OH group bearing mineral, such as sand, quartz, garnet, Wollastonite, carborundum, diatomaceous earth, gypsum etc.

A preferred abrasive is garnet for harder substrates and Wollastonite for softer substrates or minimal abrasiveness. Both are available from NYCO in New York.

The preferred prepolymer shall be mixed with an aqueous reactant phase containing the above abrasives.

Figure 1:
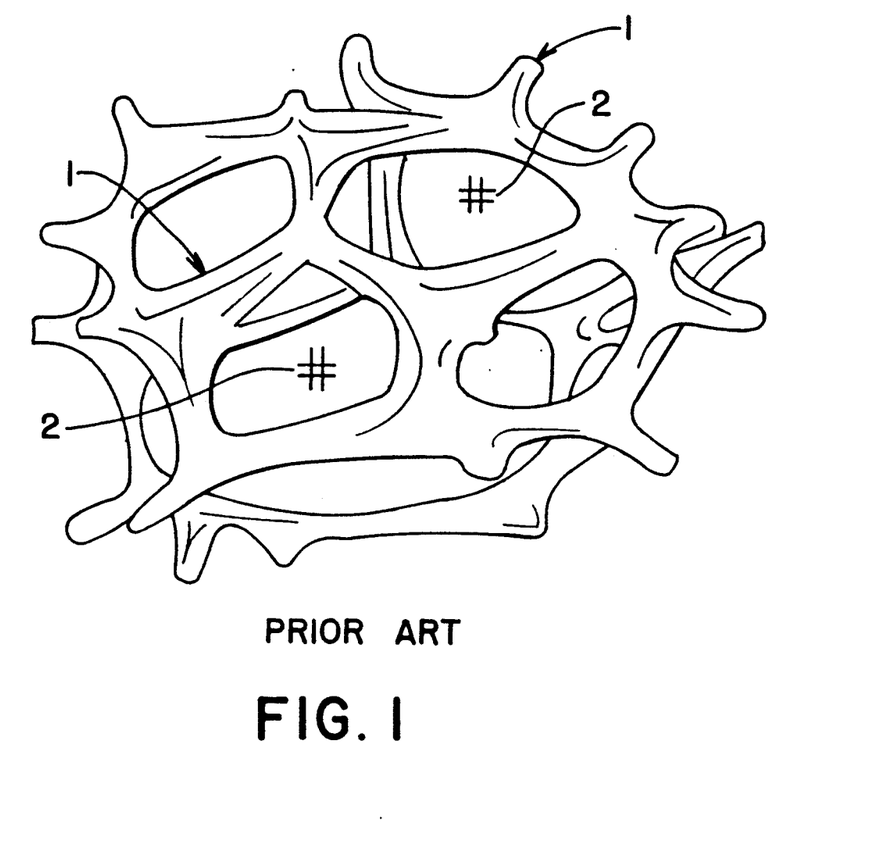
FIG. 1 is a diagrammatic representation of a prior art foam granule, such as the granule disclosed in U.S. Pat. No. 4,551,481.
Figure 2:
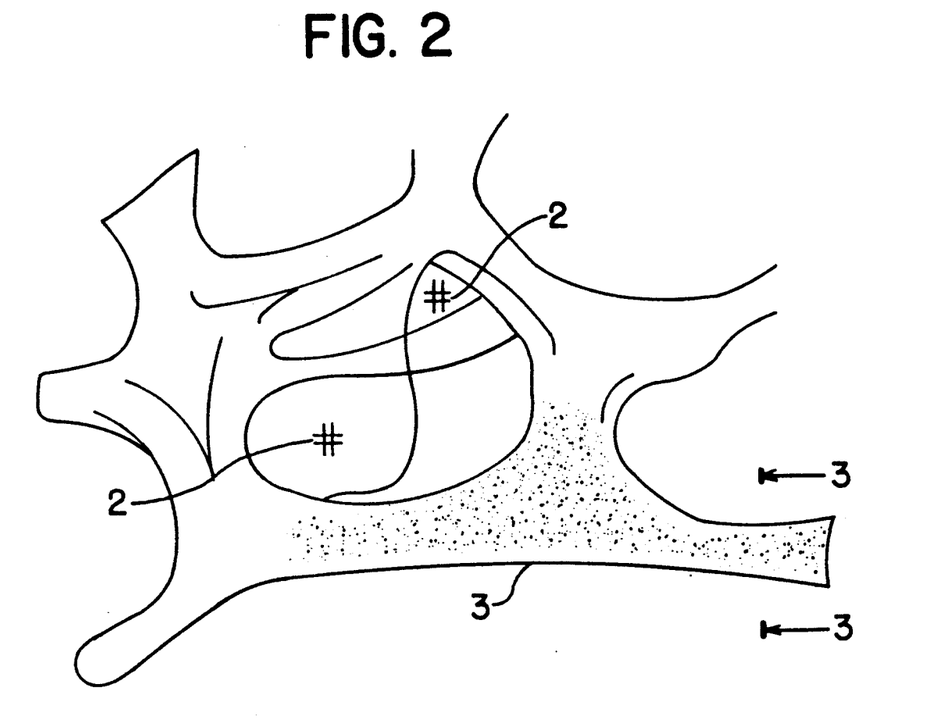
FIG. 2 is a diagrammatic representation of the improved granule of the present invention.
Figure 3:
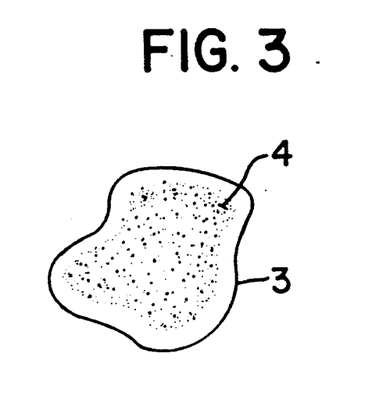
FIG. 3 is a diagrammatic cross section along section line 3—3 of FIG. 2.

Turning now to FIG. 1, a known prior art urethane strand 1 can be seen. The spacing 2 between adjacent urethane strands 1 is shown and the reticulation, which is well known in the art, is the ratio of the strand's thickness versus the space. As can be seen in FIG. 2, the space per strand ratio achieved by the interpolymer made according to the present invention is less than that of prior art FIG. 1. This is because the thicker interpolymer strands (3) of the present invention have an increased interpolymer distribution of urethane-Wollastonite (4) contained within its internal structure.

The interpolymer product is preferably prepared from an isocyanate capped polyether polyol prepolymer known as TREPOL (®) available from Twin Rivers Engineer of Boothbay, Me. A-62 is a Trepol-like material also produced by Twin Rivers. Another similar product is available from W. R. Grace of Lexington, Mass. and known as HYPOL (®). Similarities exist between these two products, but TREPOL (®) is preferred because of its better absorption, higher tensile strength and lower cost. Hypol consists of trimethylol propane (TMOP), polyethylene glycol (PEG), and TDI while TREPOL consists of PEG and TDI.

The prepolymer is chemically reacted with a large molar excess of water, on the order of about 6.5 to about 400 moles. The water is provided as an aqueous solution containing other components, such as Wollastonite and/or Staurolite and a surfactant which are all readily dispersed or soluble within the water. This differs from other urethanes which involve formation of the polymer using stoichiometric amounts of water. If desired, the prepolymer and/or the aqueous mixture can contain one or more other active ingredients. For example, an activated carbon or aqueous mixture for absorption of specific contaminant materials may also be included in the aqueous phase to be mixed with prepolymer.

In addition to the abrasive and the prepolymer other components such as surfactants, acids, suspension agents etc. to enhance handling of for example the aqueous phase might contain 0.1% to 0.5% of pluronic F88 (BASF) to increase cell size or 10% to 5% of VGUM (Vanderbilt) to better suspend the abrasive, or 1%-8% oleic acid (Hercules) to aid in cleaning brass or copper. The additions of the above and other additives are known to those skilled in the art and are minor possible additions to the total composition for adjusting and tailoring the final composition.

Bactericide or fungicide can also be included in the medium to prevent bacterial or mold growth. The interpolymer media of the invention can be used to clean oil or contaminants from industrial equipment such as in machine shops, blow molds, paper mills, ducts, manufacturing plants, paint, restaurants etc. Oil contaminated rocks can be cleaned with vacuuming of the oil-soaked medium. Thus the material is useful for environmental cleaning of e.g. oil spills.

The cleaning media of the invention can be reused. The open cells appear to hold the grease or contaminant. In water the granules sink to the bottom while the grease, oil etc. is released from the pores of the medium to rise to the top. Then the oil or grease can be skimmed off so that only a small volume of contaminant needs to be cleaned off or disposed of.

EXAMPLE 1

Firstly an aqueous phase blend having the following composition is prepared prior to mixing with prepolymer:

|  | Weight % (aqueous phase) |
|---|---|
| US Gypsum Hydrostone (Calcium Sulfate) | 65.3 |

| | Weight % (aqueous phase) |
|---|---|
| Union Carbide UCAR 154 (Acrylic Latex Emulsion) | 21.1 |
| BASF Pluronic F88 (surfactant) 1% Sol in H₂O | 13.60 |

Figure 4:
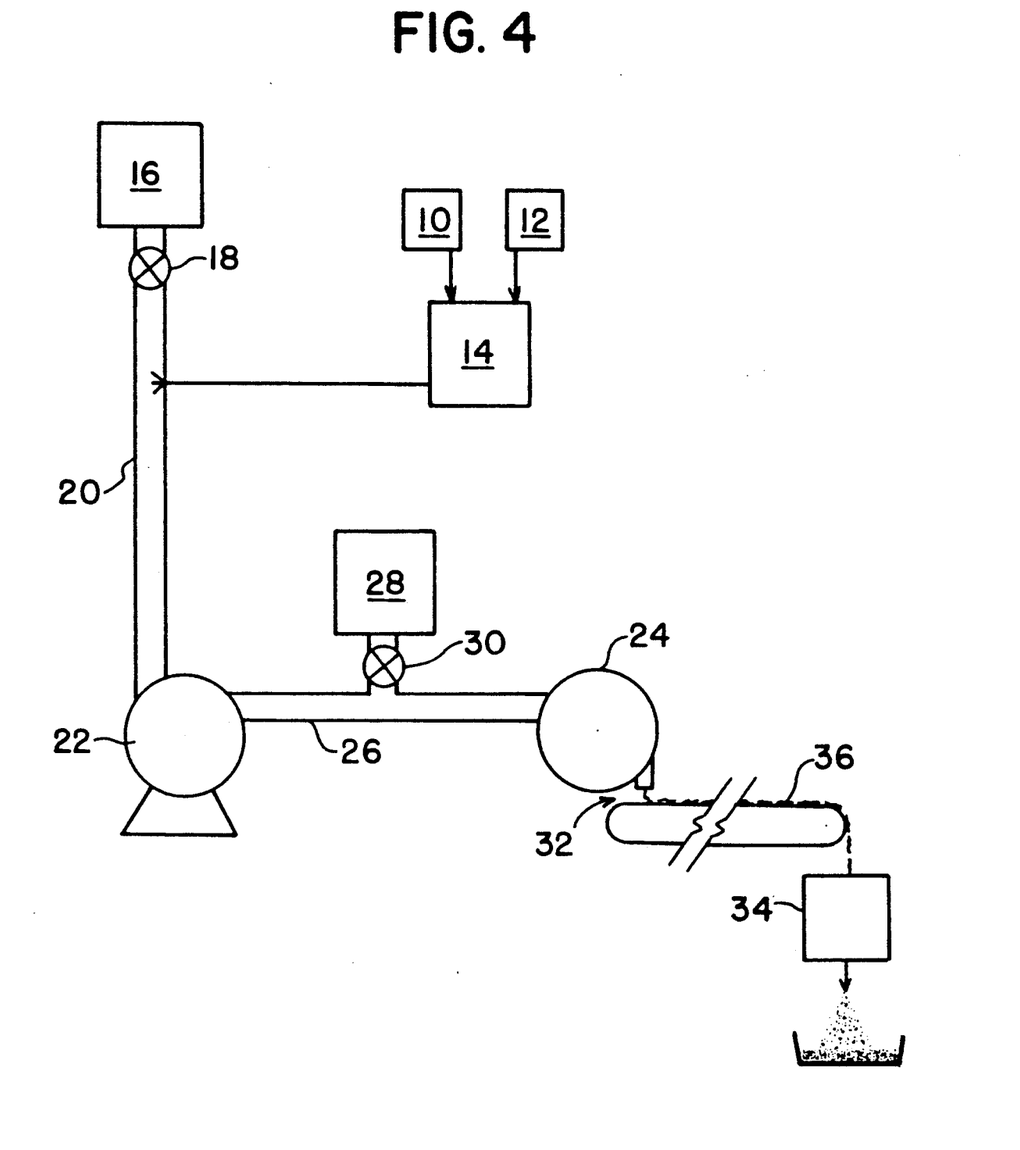
FIG. 4 is a block diagram of a process for chemically treating minerals.

To prepare the above product with reference to FIG. 4, the aqueous surfactant solution 10 and the acrylic latex 12 are continuously supplied in metered quantities and blended together in a container 14. The gypsum is metered separately from container 16 into a discharge pipe 20 by a rotary valve 18, or the like, and allowed to fall by gravity toward a pump 22. The aqueous solution of surfactant and latex from container 14 is metered and sprayed by suitable nozzle means onto the gypsum, in a desired proportion, as it falls in the discharge pipe 20. The pump 22 then pumps the admixture of the components to a rotary mixer 24 via supply pipe 26. The prepolymer, i.e. the TREPOL (®), is metered from container 28 by a suitable valve 30 into the supply pipe conveying the admixture to the rotary mixer 24. The mixture is combined with the prepolymer TREPOL (®) in a ratio of 4.75 parts admixture:1 part TREPOL (®), by weight. All of the components then enter the rotary mixer and are sufficiently mixed thereby and discharged onto a continuous conveyer belt 32 where the product is allowed to foam and cure into a urethane strip.

The mixture immediately prior to curing including the prepolymer has approximately the following composition:

| | WEIGHT % TOTAL |
|---|---|
| US Gypsum Hydrostone (Calcium Sulfate) | 53.94 |
| Union Carbide UCAR 154 (Acrylic Latex Emulsion) | 17.43 |
| BASF Pluronic F88 (surfactant) 1% Sol H₂O | 11.23 |
| Twin Rivers Eng. TREPOL (R) | 17.39 |

The interpolymer produced according to the above procedure reacts as a typical polyurethane product, that is, the mixed product is in a fluid/cream state (emulsion) immediately after mixing which then increases in volume approximately 3 fold during the next two minutes immediately following mixing as a result of the formation of carbon dioxide gases. The product then cures at room temperature for about 3–18 minutes on the conveyer belt 32. Most of the reacted components are "tack free" (i.e. non-sticky to the touch) after about 5 minutes after mixing and an additional 15 minutes or so is required to ensure that the acrylic latex is also "tack free". After this period of time (about 20 minutes total), the cured product is ground by a grinder 34 into small individual particles of media having a diameter of about 1/20,000 to ¼ inch, preferably about 1/16 to ⅛ inch. The ground media is then allowed to cure for an additional 6 to 8 hours so that the product is completely cured and can be packaged. If this product is ground before it is sufficiently cured, i.e. the product is still "tacky", it tends to clump together into large particles, after grinding, and is then too bulky to be used in the intended blasting equipment.

The product (P) manufactured from the above discussed process was tested in the intended blasting equipment and was found to have the following characteristics compared with the material of FIG. 1.

| | Product (P) | Foam Per US 4,551,481 |
|---|---|---|
| Dry Bulk Density | 0.6 | 0.3 |
| Angle Repose | 30° | 45° |
| Particle size (inches) | 1/16–⅛ | 1/16–⅛ |

EXAMPLE 2

A formula of the invention has the following final mixture immediately prior to curing:

| | Weight % (aqueous phase) |
|---|---|
| US Gypsum Hydrostone (Calcium Sulfate) | 54.12 |
| Rohm & Haas TR407 (Acrylic Latex Emulsion) | 4.2 |
| BASF Pluronic F88 10% Sol in H₂O | 23.76 |
| Germicide GERMABEN II (R) (Sutton Laboratories, N.J.) | 0.41 |
| Twin Rivers Eng. TREPOL (R) | 17.50 |

In the above product, a germicide has been added to control the formation of fungus and other bacteria, a greater percent solution of F88 surfactant was used and the UCAR 154 acrylic latex has been replaced with a TR 407 acrylic latex which is cheaper in cost.

EXAMPLES 3–8

| | % by Wt. Total Formula | | | | | |
|---|---|---|---|---|---|---|
| Example | 3 | 4 | 5 | 6 | 7 | 8 |
| Calcium Sulphate | | | 54.34 | 54.12 | 54.12 | 60.56 |
| Water | 23.07 | 23.03 | | | 23.76 | 19.31 |
| Barium Sulphate | 66.20 | 66.06 | | | | |
| Silane | .52 | .52 | | | | |
| Phosphoric Acid | Qs | Qs | | | | |
| Bacteriocide | .54 | .54 | .5 | .41 | .41 | .42 |
| Triton X100 Surfactant | | .18 | | | | |
| F88 Surfactant (10% sol) | | | 10.87 | 23.76 | | |
| Ucar 154 (Acrylic) | | | 17.38 | 4.20 | | |
| Rhoplex TR407 (Acrylic) | | | | | 4.20 | 4.74 |
| Trepol (Prepolymer) | | | 17.34 | 17.5 | 17.5 | 14.9 |
| A-62 (Prepolymer) | 9.6 | 9.6 | | | | |

(QS as required to bring product to proper pH of about 7.8). In examples 3–8 the % are before curing.

It is to be appreciated that the above weight percentages in the examples are only illustrative of suitable amounts and are not meant to limit the invention herein. The gypsum can have a range of from about 10 to about 75%, the surfactant can have a range of from about 0.0 to about 10%, the acrylic latex can have a range from about 0 to about 25%, the prepolymer can have a range of from about 5 to about 95%. Thus it is seen that those skilled in the art can produce useful granules varying proportions of materials as above. Thus removal of latex and/or surfactant as seen above also produced a useful granule. For the above formulations it has been found that gypsum is the most preferred alkaline earth sulphate material.

The latex which is an Acrylic Copolymer could be replaced with Styrene Butadiene Rubber Copolymers or Vinyl Chloride, or Vinyl Acetate, or Styrenated Acrylics.

The base acrylic latexes utilized in the present invention are well known in the art. They are generally prepared by polymerizing one or more alkyl acrylate and/or methacrylates containing 1 to 18 carbon atoms in the alkyl group. One or more other copolymerizable monomers can also be included, selected from vinyl and vinylidene halides, carboxylic acids selected from $\alpha$-$\beta$-olefinically unsaturated carboxylic acids containing 3 to 5 carbon atoms and esters thereof containing 4 to 20 carbon atoms, mono-unsaturated dicarboxylic acids containing 4 to 8 carbon atoms nitriles selected from $\alpha,\beta$-olefinically unsaturated nitriles containing 3 to 5 carbon atoms; acrylamides derived from acrylic and methacrylic acids and their N-alkylol and N-alkoxyalkyl derivatives containing 3 to 12 carbon atoms, polymerizable ethylenically unsaturated monocarboxylic and dicarboxylic acids containing 3 to 8 carbon atoms and esters thereof containing 4 to 20 carbon atoms, vinyl ethers containing 4 to 22 carbon atoms, vinyl ketones containing 3 to 12 carbon atoms; vinyl esters of carboxylic acids containing 4 to 22 carbon atoms; o-olefins containing 2 to 12 carbon atoms, styrene and styrene derivatives; and other polyfunctional monomers.

The more common comonomers which are polymerized with one or more of the alkyl acrylates and/or methacrylates include styrene, acrylonitrile, acrylic acid, acrylamide, methacrylamide. N-methylol acrylamide, N-methylol methacrylamide, vinyl chloride, and itaconic acid. Other sulfates such as barium sulfate can be used.

Mechanically U.S. Pat. No. 4,551,481 describes a highly reticulated (see FIG. 1) foam. It also describes a bun of low tensile strength. It has been found that the product of the instant invention is significantly higher in tensile strength while having a much lower reticulation (see FIG. 2).

A catalyst can be added to the aqueous and prepolymer components, if desired, to increase the speed of the chemical reactions for producing the product of the present invention. For instance, a terra alba additive can be added to the admixture while an amine may be added along with the prepolymer. In addition, the application of heat, in the range of 100° to 120° F., also decreases the reaction time.

EXAMPLE 9

An aqueous phase blend having the following composition is prepared prior to adding the prepolymer:

| | Weight % (aqueous phase) |
|---|---|
| Water | 30.49 |
| Wollastonite | 67.11 |
| BASF Pluronic F88 (surfactant) | 2.40 |

To prepare the above product with reference to FIG. 4, the aqueous, surfactant, Wollastonite solution 10 are blended together in a container 14. The pump 22 then pumps the admixture of the components to a rotary mixer 24 via supply pipe 26. The prepolymer, i.e. the TREPOL (®), is metered from container 28 by a suitable valve 30 into the supply pipe conveying the admixture to the rotary mixer 24. The mixture is combined with the prepolymer TREPOL (®) in a ratio of 4.75 parts admixture:1 part TREPOL (®), by weight. All of the components then enter the rotary discharged onto a continuous conveyer belt 32 where the product is allowed to foam and cure into a urethane strip.

The mixture (without latex) immediately prior to curing has approximately the following composition:

| | WEIGHT % TOTAL |
|---|---|
| Water | 24.12 |
| Wollastonite | 53.1 |
| BASF Pluronic F88 (surfactant) | 1.9 |
| Twin Rivers Eng. TREPOL (R) | 20.88 |

The interpolymer produced according to the above procedure reacts as a typical polyurethane product, that is, the mixed product is in a fluid/cream state (emulsion) immediately after mixing which then increases in volume approximately 3 fold during the next two minutes immediately following mixing as a result of the formation of carbon dioxide gases. The product then cures at room temperature for about 3-18 minutes on the conveyer belt 32. Most of the reacted components are "tack free" (i.e. non-sticky to the touch) after about 5-15 minutes after mixing. After this period of time (about 20 minutes total), the cured product is ground by a grinder 34 into small individual particles of media having a diameter of about 1/20,000 to ¼ inch, preferably about 1/16 to-⅛ inch. The ground media is then allowed to cure for an additional 6 to 8 hours so that the product is completely cured and can be packaged. If this product is ground before it is sufficiently cured, i.e. the product is still "tacky", it tends to clump together into large particles, after grinding, and is then too bulky to be used in the intended blasting equipment.

The product (P) manufactured from the above discussed process was tested in the intended blasting equipment and was found to have the following characteristics compared with the material of FIG. 1.

| | Product (P) | Foam Per US 4,551,481 |
|---|---|---|
| Dry Bulk Density | 0.6 | 0.3 |
| Angle Repose | 30° | 45° |
| Particle size (inches) | 1/16-⅛ | 1/16-⅛ |

EXAMPLE 10

Another example of the invention has the following final mixture immediately prior to curing:

| | Weight % (aqueous phase) |
|---|---|
| Water | 4.21 |
| Wollastonite | 54.12 |
| BASF Pluronic F88 10% Solution in H₂O | 23.76 |
| Germicide GERMABEN II (R) (Sutton Laboratories, N.J.) | 0.41 |
| Twin Rivers Eng. TREPOL (R) | 17.50 |

In the above product, a germicide has been added to control the formation of fungus and other bacteria and a greater percent solution of F88 surfactant was used.

EXAMPLES 11-12

| Abrasive Formulation | | Non-abrasive Formulation |
|---|---|---|
| 11.68% | water | 24.58% |
| 18.38% | Wollastonite (calcium metasilicate) | 52.95% |
| 0.73% | F88 (10% Solution) | 1.92% |
| 48.7% | "Starblast ®" (Iron Aluminum Silicate) | |
| 0.5% | "Silane" organo silane | |

| Abrasive Formulation | | Non-abrasive Formulation | |
|---|---|---|---|
| 20.0% | ester | Prepolymer (Trepol) | 21.05% |

EXAMPLE 13

The mineral and/or abrasive may be present in a varied range of proportions in relation to the prepolymer. Generally the percentage of abrasive to total composition can vary from 1% to over 90%, more preferably in the 70 to 90% range. The abrasive is much lower in cost and higher in specific gravity so that its use at the highest level of addition is important in overall cost is density.

The particulate abrasive is preferably a water insoluble, OH group bearing mineral, such as sands, Quartz, Garnet, Wollastonite, gypsum, carborundum, diatomaceous earth, etc.

A preferred abrasive is garnet for harder substrates and Wollastonite for softer substrates or minimal abrasivity both available from "NYCO" New York.

The preferred prepolymer shall be required to be mixed with an aqueous reactant phase containing the above abrasives. There is commercially available such prepolymers as described in U.S. Pat. No. 4,137,200 to W. R. Grace known as "Hypol". "Trepol" is manufactured by Rynel Corp. Boothbay, Me. The preferred prepolymer is Trepol with its lower cost, higher strength, and more absorption. In addition to the abrasive and prepolymer other components can be added to the aqueous phase such as surfactants, acids, suspension agents etc. to enhance handling or effectiveness.

For example, the aqueous phase might contain 0.1% to 0.5% of Pluronic F88 (BASF) to increase cell size, or 0.1% or 0.5% of V Gum (Vanderbilt) to suspend abrasive, or 1%-8% oleic acid (Hercules) to aid in cleaning brass and copper. The additions of the above and others are known to those skilled in the art and are minor additions to the total for taking the final composition.

FIG. 2 shows a cross section of a single particle of abrasive/urethane binder. The urethane binder may or may not contains additives, and the particle size may range from 1/32-¼" in envelop size.

1. Urethane Binder
2. Abrasive
3. Air Pocket

Further examples of components and ranges follow.

EXAMPLE 14

| Component | Range |
|---|---|
| Water | 2%-30% |
| Abrasive | 3%-70% |
| Thickener | 0.5-2% |
| Coupling Agent | 0.1-2.8% |
| Active Ingredient | 5-30% |
| Surfactant | 0.05-1.10% |
| Prepolymer | 4-20% |

The above ranges show the varying amounts of individual components able to be used. In general the temperature of the aqueous phase is about 60° F. and that of the polymer phase about 80° F.

Water—the water component is used to fluidize aqueous phase and react the prepolymer into foam.

Abrasive—the abrasive will abrade the soil yet not degrade the surface to be cleared.

Thickener—holds aqueous phase in suspension by increasing viscosity thickeners tested are conventional thickening agents such as Vee-gum, Carbipol, CMC, gums, etc.

Coupling agent—the coupling agent reacts onto selected abrasive and also reacts with urethane so as to bind abrasive into foam during comminutation and use.

Active ingredient—many actives can be added to satisfy the requirement such as detergents, acids, water soluble paint stripper, solids, oils, etc. Those skilled in the art may see the value of addition of many more.

Surfactant—The surfactant controls cell size and aids actives do the job. Non-ionic surfactants are preferred such as BASF pluronic series.

Prepolymer—A urethane forming flexible or semi-rigid is preferred similar to Trepol or Hypol so that it is absorbent of noxious material which it is to remove.

Figure 6:
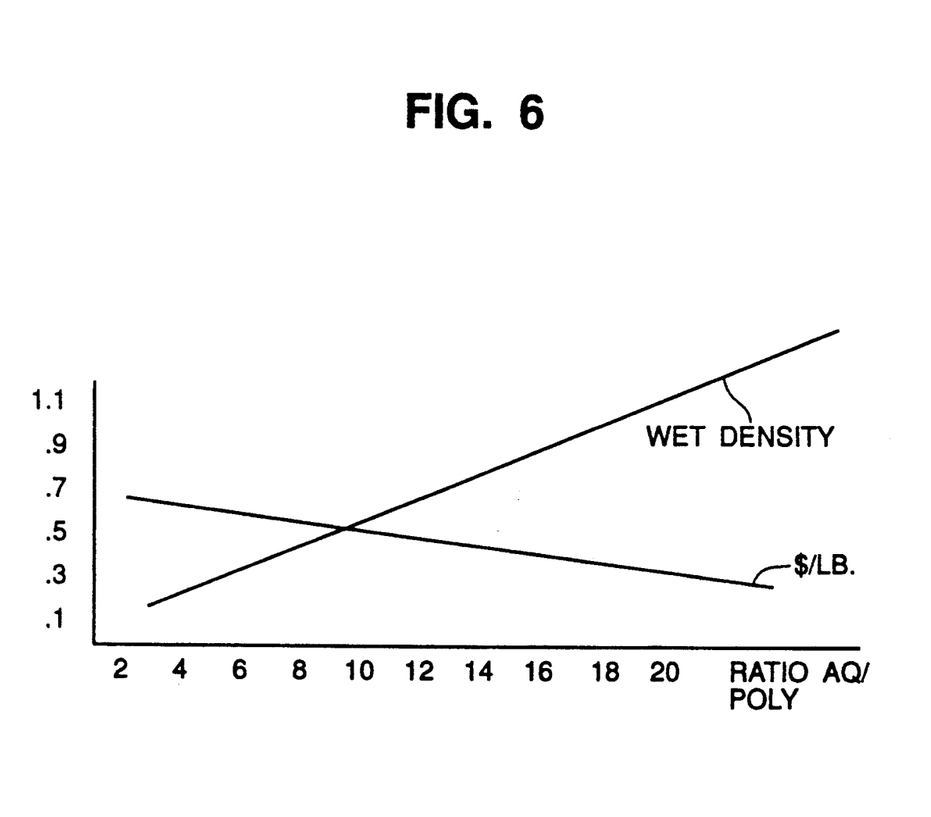
FIG. 6 shows mineral content versus cost.

For all formulations showing usefulness in trials, a graph was set up to compare density vs cost (FIG. 6). As less prepolymer is used, the cost goes down. As more Aqueous phase is used, the wet density goes up. Where lines cross is the optimal formulation.

EXAMPLE 15

The following examples show various formulations tested:

| | Date | | | | | | | | |
|---|---|---|---|---|---|---|---|---|---|
| | 7/88 | 3/10 1990 | 4/11 1990 | 12/27 1990 | 2/12 1991 | 2/12 1991 | 4/2 Star | 4/03 Hiden | 7/23 Garnet |
| | | | | | Exp. No. | | | | |
| | 1 | 2 | 3 | 4 | 5 | 6 | 7 | 8 | 9 |
| Water | 38.4 | 19.78 | | 23.13 | 20.06 | 14.54 | 11.7 | 24.08 | 27.39 |
| Speedy Dri | 45.1 | | | | | | | | |
| Silane | .5 | .5 | | .52 | | .13 | .24 | | .215 |
| 10% Surf | 6.8 | | 10.87 | | 2.02 | 1.45 | .73 | 1.92 | |
| Prepolymer | 9.1 | 9.1 | 17.39 | 9.09 | 25.0 | 20.0 | 20.0 | 21.05 | 17.45 |
| Feldspar | | 52.46 | | | | | | | |
| Triton X100 | | .09 | | | | | | | |
| Latex | | 18.0 | 17.4 | | | | | | |
| Vee Gum | | | | | | | | | .9 |
| Cal Sulphate | | | 53.93 | | | | | | |
| Bacteriacide | | | .41 | | | | | | |
| Barium Sulphate | | | | 66.2 | 52.7 | 37.81 | | | |
| Phosphoric Acid | | | | 1.06 | | | | | |
| Garnet | | | | | | | | | 43.13 |
| Color | | | | | .22 | | | | |
| Flintshot | | | | | | 26.04 | | | |

-continued

| | Date | | | | | | | | |
|---|---|---|---|---|---|---|---|---|---|
| | 7/88 | 3/10 1990 | 4/11 1990 | 12/27 1990 | 2/12 1991 | 2/12 1991 | 4/2 Star | 4/03 Hiden | 7/23 Garnet |
| | | | | | Exp. No. | | | | |
| | 1 | 2 | 3 | 4 | 5 | 6 | 7 | 8 | 9 |
| Staurolite Sand | | | | | | | 48.95 | | |
| Wollastonite | | | | | | | 18.38 | 52.56 | 15.75 |
| Green base | | | | | | | | .39 | |
| Yellow base | | | | | | | | | .25 |

All formulas were tested for the their use in machinery under patent application Ser. No. 376,764, now abandoned filed Jul. 7, 1989 by Sponge Jet incorporated.

The foams were ground down to a size of 1/10-⅛ inch particle size and propelled at a surface through the machine. Each particle hits and picks up the material to be removed. After use, the particles are collected and washed. Washing oil out of the particle is done by subjecting soiled particles to a water phase where foam particle sinks and oil floats. The oily floating debris is then decanted for hazardous waste removal and the foam particle is dried for reuse. The volume for hazardous waste removal is thereby reduced.

Understanding the above sets up criteria for the various desirable particle characteristics:

Density—Must flow through machine without bridging and allow propulsion through the air to hit substrate with impact. Requires 15-30 lb/cu ft. wet density.

Bulk Density—Ground up foam particles must maintain dry bulk density to satisfy above bulk density of 1.5-5.0 and above.

Angle of Repose—Must meet included angle of repose to flow in machine with minimal bridging in hopper and no plugging of nozzle.

Water Soluability—Particles must not be water soluble so that they will be able to go through the wash cycle without agglomerating.

Aggressiveness—Particles must be aggressive enough to remove soil yet not harm substrate. This is accomplished by selection of particle size and hardness of abrasive added in conjunction with polymer coating of particles.

Dusting—particles upon impact must not fracture and must produce little or no residual dusting during use.

Adsorption—particles must adsorb soil from substrate and allow cleaning for reuse. This is accomplished by adding selective active ingredients to aqueous phase.

EXAMPLE 16

A preferred medium brown formula using Staurolite (Starblast) is:

| | % Aqueous | % polymer | % total |
|---|---|---|---|
| Water | 14.6 | | 11.68 |
| F88 10% | 0.91 | | 0.73 |
| VEEGUM | 0.3 | | 0.24 |
| STARBLAST | 61.0 | | 48.8 |
| SILANE | 0.31 | | 0.25 |
| WOLLASTONITE | 22.88 | | 18.30 |
| TREPOL | | 100 | 20.00 |
| | Percent | Ratio | Temp °C. |
| Aqueous | 80 | 4 | 60 |

-continued

| Polymer | 20 | 1 |
|---|---|---|

EXAMPLE 17

Another preferred hard yellow formulation using Garnet #50 (NYCO) is:

| | % Aqueous | % polymer | % total |
|---|---|---|---|
| Water | 8.79 | | 7.25 |
| 5% Vee Gum Solution | 19.32 | | 15.94 |
| Garnet #50 | 52.25 | | 43.13 |
| Silane A 1120 | .261 | | .215 |
| Wollastonite 10012 | 19.08 | | 15.75 |
| Yellow Base | .3 | | .25 |
| Trepol | | 100 | 17.45 |
| | Percent | Ratio | |
| Aqueous | 82.55 | 4.73 | |
| Polymer | 17.45 | 1 | |

EXAMPLE 18

A preferred soft green formulation using Wollastonite 10012 (NYCO) is:

| | % Aqueous | % polymer | % total |
|---|---|---|---|
| Water | 30.0 | | 24.08 |
| *Tamol SN | 0.5 | | 0.39 |
| 10% F88 Solution | 2.44 | | 1.92 |
| Wollastonite 10012 | 66.56 | | 52.54 |
| Green base | 0.5 | | 0.394 |
| Trepol | | 100 | 21.05 |
| | Percent | Ratio | |
| Aqueous | 78.95 | 3.75 | |
| Polymer | 21.05 | 1 | |

*Tamol SN is a sodium salt of condensed naphthalene sulphonic acid and is supplied by Rohm and Haas.

It is found that Wollastonite toughens up the sponge, helps the sponge maintain itself for the cleaning cycle or for being wrung out, hardens and enhances the ability of the sponge to flow through the blasting or propelling machinery. Also an unexpected result is the reduction of flash rusting on carbon steel cleaned with use of Wollastonite.

Figures 5A, 5B, 5C:
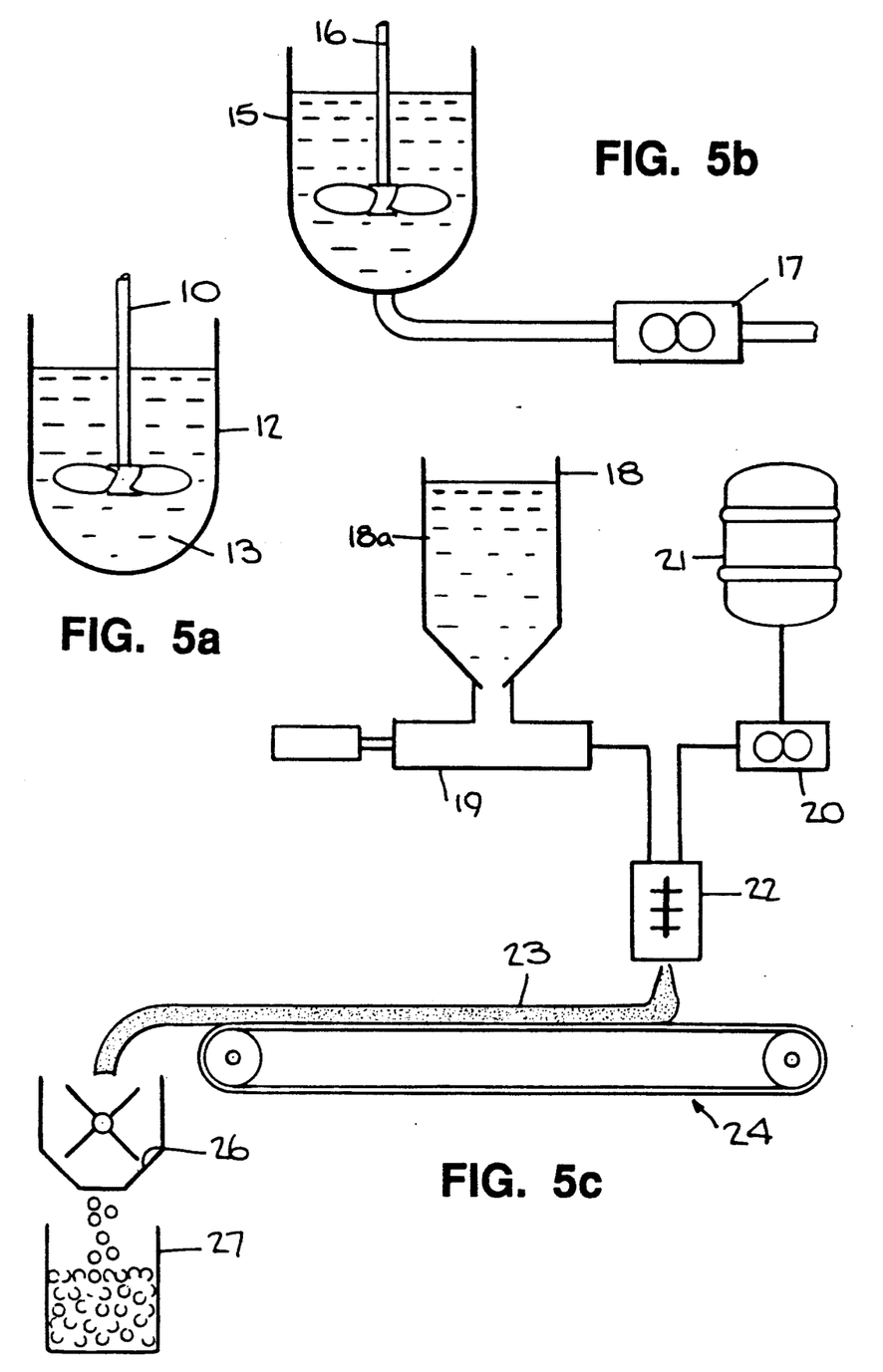
FIGS. 5a, 5b and 5c are block diagrams showing the process for manufacturing the improved granule of the present invention.

Staurolite is present as in formulation where more abrasive aggressiveness is required. Garnet is used in the most abrasive aggressive application. To prepare the above abrasive formula the Iron Aluminum Silicate ("Starblast") Dupont, or Garnet (NYCO) is first treated with "Silane", A 1100 series @0.5% Silane to either abrasive. There is a chemical reaction of Silane onto either abrasive. FIG. 5a shows a tank (12) containing starblast and Silane (13) with an agitator (10).

The aqueous phase components i.e. water, F88, Wollastonite abrasive, starblast (optional) FIG. 5b are added to a mix tank (15) in order of addition, and mixed (16) into a homogenous blend. The above Aqueous phase is shown in FIG. 5b and is pumped out of (17) mix tank to holding tank (18) in FIG. 5c.

To make foam, the aqueous phase (18a) is metered out of the holding tank in FIG. 5c with a metering pump (19). At the same time "Trepol" Prepolymer is metered out (20) of 55 gallon storage drums (21) and both streams in proper ratio are mixed in rotary mixer (22). The liquid output reacting foam (23) of mixer is deposited onto a conveyor belt (24) whereon it rises and cures along the length of the belt. After curing, the foam is solid enough to be fed into a grinder (26), ground up, and fed through a sizing screen and packaged in bags (27).

The less abrasive product Example 18 is made similarly without the addition of additional abrasives and with changing the ratio of components. It is to be appreciated that the above weight percentages in the examples are only illustrative of suitable amounts and are not meant to limit the invention herein. The Wollastonite and/or can have a range of from about 10 to about 75%, the surfactant can have a range of from about 0.0 to about 10%, and the prepolymer can have a range of from about 5 to about 95%. Thus it is seen that those skilled in the art can produce useful granules varying proportions of materials as above. For the above formulations it has been found that metasilcates such as Garnet, Wollastonite and or Staurolite are the most preferred alkaline earth materials.

Mechanically U.S. Pat. No. 4,551,481 describes a highly reticulated (see FIG. 1) foam of 13 vm. It also describes a bun of low tensile strength. It has been found that the product of the instant invention is significantly higher in tensile strength while having a much lower reticulation (see FIG. 2).

A catalyst can be added to the aqueous and prepolymer components, if desired, to increase the speed of the chemical reactions for producing the product of the present invention. For instance, a terra alba additive can be added to the admixture while an amine may be added along with the prepolymer. In addition, the application of heat, in the range of 100° to 120° F., also decreases the reaction time.

The product of the present invention is particularly useful as a carrier of a wide variety of biologically active substances which have cleanup value, especially for the use in the clean up of hazardous materials. It is possible to achieve a substantially uniform distribution of such substances within the media by adding them to the aqueous components so that they can be homogeneously distributed and mixed throughout the product before curing. Examples are fungicide, germicide, bactericide, activated carbon, ionic resin beads, superabsorbants for water, detergents, abrasives, enzymes and pH controllers. The removal of lead paint can be done with or without stripper present. The granules are also used for cleaning the surfaces of buildings.

A particular application for the product of the present invention, which fully exploits its advantageous properties, is in physical cleanup of vehicles or of industrial equipment as found in a "machine shop", for instance. Recent Environmental Protection Agency regulations describe the by-product from a typical prior art "power wash" (high pressure water & detergent) as a hazardous waste because the spent cleaning material (by-product) contains oil and other contaminants which have been removed during the cleaning process. The interpolymer product according to the present application, when propelled against soiled machinery, dislodges and absorbs all of the oil and other contaminants, does not affect surface finish of the vehicle or machinery, is easily collected as a dry granule material, does not dust and/or contaminate the area being cleaned, and can be separated, recycled and reused again. The residue oil or contaminant separated from the residue is then present in a small volume for disposal.

Wollastonite with prepolymer has been used to make round foam balls of about one inch in diameter to scrape i.e. clean the walls of tubes of the same inside diameter in nuclear power plants. Here the cleaning is done together with water pumped through the tubes. These balls contained additional polymer in addition to the Trepol.

In various environmental rules in different states it is necessary to dispose of hazardous waste at a special waste disposal site if the waste level exceeds certain guidelines. This is expensive. Thus oil and grease from power wash may be 57,500 ppm while a state limit may be 5 ppm for discharge. This is expensive. Power wash as in the prior art can produce large amounts of such materials. The invention controls levels to smaller volumes thus reducing hazardous waste disposal. Stringent rules in California often prohibit power wash of any kind. In Maine cleaning of paper mills requires notification of the local sewer district which then can refuse disposal or charge a fee. Smaller fees would be incurred since the invention leads to smaller volumes of contaminants. This avoids costly environmental cleanups. A recent clean-up in Maine cost more than $4 million dollars.

For example, the invention can be used to remove lead paint softened by conventional strippers, or not. The granules are then totally incinerated, or separated from lead for disposal. The use of liquid strippers in the prior art creates a dangerous problem in removal of stripper plus lead paint. Testwork of the invention in Boston's Callahan tunnel reduced tetraethyl lead content on surfaces therein from 20,000 ppm to 40 ppm which is 10 times better than the EPA requirement of 400 ppm for safe conditions for workers.

Baking soda ($NaHCO_3$) is used in water-injected wash or blasting in the prior art. Water is used to suppress the dust from the baking soda. By mixing the soda with damp sponge material of soda present will continue to achieve the desired cleaning effect. Other cleaning media which produce dust can also be used in the above manner such as agricultural media as corn cob, walnut and also silica sand and any carbon product.

For other cleaning processes, the active ingredient product is first mixed into an aqueous phase, allowed to foam and ground into small particles for use in air blasting equipment. Each particle is then considered a minute absorbing sponge which, when placed in water, would sink. This characteristic leads to easy separation of product from its absorbed contaminants. Spent or used foam particles, after removing any residual noxious contaminates, can be separated for proper disposal. The hazardous waste can then be reduced to its minimal volume, water can be reduced by evaporation and the like, rather than being emulsified in a large quantity of pressure wash effluent.

With respect to lead or other foreign solid matter, the particles of the invention containing the lead can be screened, the screened particles can be swollen by wetting and rescreened to separate the solid foreign matter from the particles. The particles may then be reused.

The sponge material of the invention can be used together with acid or detergents to clean soiled building surfaces whereby graffiti may be removed from brick concrete, etc. without descrution of substrate.

Since certain changes may be made in the above interpolymer material without departing from the spirit and scope of the invention herein involved, it is intended that all matter contained in the above description and shown in the accompanying drawings shall not be construed as limiting the invention but shall be interpreted merely as examples illustrating the inventive concept herein.

We claim:

1. Composition comprising the reaction product of a water foamable prepolymer abrasive, inorganic mineral and water to increase abrasiveness or density.

2. The composition of claim 1 wherein the mineral is selected from the group consisting of alkaline earth, aluminum and silicon containing minerals.

3. The composition of claim 1 wherein the mineral is an alkaline earth sulphate.

4. The composition of claim 1 wherein the alkaline earth sulphate is calcium sulphate or barium sulfate.

5. The composition of claim 1 wherein the mineral is at least one selected from the group consisting of garnet, calcium metasilicate, barium metasilicate, quartz, diatomaceous earth, sands, carborundum and iron aluminum silicate.

6. The composition of claim 1 wherein the prepolymer is a urethane prepolymer.

7. The composition of claim 1 comprising an isocyanate-capped water-foamable prepolymer.

8. The composition of claim 1 further comprising an acrylic latex.

9. The composition of claim 1 further comprising a surfactant.

10. The composition of claim 1 further comprising silane.

11. The composition of claim 1 further comprising a germicide.

12. The composition of claim 1 further comprising an acid.

13. The composition of claim 1 for use as a particulate propellant to remove foreign substances adhering to a surface comprising a lipophilic/hydrophilic urethane-mineral interpolymer.

14. Composition for a lipophilic/hydrophilic abrasive propellant for removing foreign substances adhering to a surface comprising a reaction product of
a) a water-foamable prepolymer;
b) water;
c) a surfactant; and
d) an abrasive, inorganic mineral.

15. The composition of claim 14 comprising a water-foamable isocyanate capped prepolymer.

16. The composition of claim 14 comprising a linear isocyanate capped prepolymer having a reactive functionality of less than 2.

17. The composition of claim 14 further comprising an acrylic latex polymer.

18. The composition of claim 14 further comprising a silane.

19. The composition of claim 14 comprising a cell formation regulating amount of surfactant and water.

20. The composition of claim 14 wherein the surfactant is a non-ionic surface active agent.

21. The composition of claim 14 wherein the surfactant comprises 0.5-5% by weight of prepolymer.

22. The composition of claim 1 or 14 wherein the prepolymer is prepared from a toluene diisocyanate.

23. The composition of claim 14 wherein the prepolymer is a polyether glycol reacted with 2-4-26 toluene diisocynanate.

24. The composition of claim 14 wherein the prepolymer is derived from a difunctional, active hydrogen-containing initiator and one or more 1,2-epoxides.

25. The composition of claim 14 wherein the prepolymer is derived from polyethylene glycol and toluene diisocyanate.

26. The composition of claim 1 or 14 wherein the prepolymer is prepared from a substantially linear polyether polyol of the formula wherein m or n is an integer from 2 to about 250 and m and n together is an integer from 3 to about 500.

27. The composition of claim 26 wherein m or n is approximately 5 to 80 and m and n together is an integer of approximately 20 to about 200.

28. The composition of claim 26 wherein the polyol is of an average molecular weight of approximately 200 to 20,000.

29. The composition of claim 26 wherein the polyol is of an average molecular weight of approximately 800 to 10,000.

30. A method for preparing a lipophilic/hydrophilic propellant for removing foreign substances adhering to a surface comprising
a) reacting and foaming a water-foamable polyether prepolymer with water wherein the water provided is an aqueous medium containing an abrasive, inorganic mineral; and
b) curing the foamed product of step a) at room temperature until tack-free.

31. The method of claim 30 wherein the prepolymer is an isocyanate capped urethane.

32. The method of claim 30 wherein the water is approximately 6.5 to 400 molar excess to the prepolymer.

33. The method of claim 30 wherein the curing time is approximately 20 minutes.

34. The method of claim 30 further comprising comminuting the polymer product wherein the comminuted product is cured for an additional 6-8 hours.

35. The method of claim 30 further comprising using a catalyst.

36. The method of claim 30 wherein the reaction is conducted at about 100°-120° F.

37. The method of claim 30 wherein the aqueous solution comprises a mineral selected from the group consisting of at least one of quartz, sand, carborundum, diatomaceous earth, calcium metasilicate, barium metasilicate, iron aluminum silicate garnet and gypsum.

38. The method of claim 30 wherein the aqueous solution comprises a mineral and surfactant.

39. The method of claim 30 wherein the aqueous solution comprises calcium metasilicate.

40. The polymeric material of claim 14 consisting by weight of 1-90% mineral;
2-30% water;
0.5-1.10% surfactant; and
4-20% polyether polyol prepolymer prior to curing.

41. The polymeric material of claim 14 further consisting by weight of
0.5-2% thickener;
0.1-2.8% coupling agent; and
5%-30% active ingredient.

42. The polymeric material of claim 41 wherein the active ingredient is selected from the group consisting of germicide, acids, paint stripper, oils, cleansers, detergents and aromatic materials.

43. A method for removing foreign substances from a surface comprising impacting the material of claim 14 under pressure onto said surface.

44. A method for removing foreign substances from the polymer material of claim 14 comprising
adding the material to water;
allowing the material to sink in the water while releasing the foreign substance into the water; and
permitting separation of the polymer and the foreign substance.

45. Method for removing foreign solid substances from the polymer material of claim 14 comprising
1) screening oily foam granules containing solid foreign substance through specific screen size permitting passage of the polymer material,
2) wetting the screened material to swell the polymer material to a size greater the screen size in 1), and
3) rescreening as in 1) to separate polymer material from the solid foreign substance.

46. The polymeric material of claim 14 consisting by weight of
14.6% water;
0.91% F88 (10% solution);
0.3% VEE GUM;
61% Starblast
22.88% Wollastonite
20% Trepolymer prior to curing.

47. The polymeric material of claim 14 consisting by weight of
8.79% water;
19.32% VEE GUM (5% solution)
52.25% Garnet #50;
0.261 Silane A1120
19.08% Wollastonite
13% Yellow Base
17.45% Trepol prior to curing.

48. The polymeric material of claim 14 consisting by weight of
$30H_2O$;
0.5% Tamol SN;
2.44% surfactant (10% aqueous solution);
66.56% Wollastonite;
0.5% Green Base; and
21.05 Trepol prior to curing.

* * * * *